United States Patent
Austin et al.

(10) Patent No.: US 10,430,843 B2
(45) Date of Patent: Oct. 1, 2019

(54) METHOD AND SYSTEM FOR PURCHASING NON-FUEL MERCHANDISE

(75) Inventors: Andrew Austin, Houston, TX (US); Walter Woodrow, Katy, TX (US)

(73) Assignee: ADDITECH, INC., Sugar Land, TX (US)

(*) Notice: Subject to any disclaimer, the term of this patent is extended or adjusted under 35 U.S.C. 154(b) by 89 days.

(21) Appl. No.: 12/787,721

(22) Filed: May 26, 2010

(65) Prior Publication Data

US 2010/0306069 A1 Dec. 2, 2010

Related U.S. Application Data

(60) Provisional application No. 61/183,045, filed on Jun. 1, 2009.

(51) Int. Cl.
| | |
|---|---|
| G06Q 30/00 | (2012.01) |
| G06Q 30/06 | (2012.01) |
| G06Q 10/06 | (2012.01) |
| G06Q 20/20 | (2012.01) |
| G07F 9/00 | (2006.01) |
| G07F 13/02 | (2006.01) |

(52) U.S. Cl.
CPC .......... G06Q 30/06 (2013.01); G06Q 10/06 (2013.01); G06Q 20/20 (2013.01); G07F 9/006 (2013.01); G07F 13/025 (2013.01)

(58) Field of Classification Search
CPC ........ G06Q 10/00; G06Q 20/00; G07F 13/06; H04L 9/08
USPC ............ 705/30, 34, 40, 21, 71, 16; 700/241
See application file for complete search history.

(56) References Cited

U.S. PATENT DOCUMENTS

| | | | |
|---|---|---|---|
| 4,131,215 A * | 12/1978 | Hansel .................. | B67D 7/744 222/145.4 |
| 4,410,949 A | 10/1983 | Huellinghorst et al. | |
| 4,754,410 A | 6/1988 | Leech et al. | |
| 4,876,653 A | 10/1989 | McSpadden et al. | |
| 5,018,645 A * | 5/1991 | Zinsmeyer ............ | B67D 7/425 222/132 |
| 5,029,100 A | 7/1991 | Young et al. | |
| 5,118,008 A | 6/1992 | Williams | |
| 5,163,586 A | 11/1992 | Zinsmeyer | |
| 5,195,466 A | 3/1993 | Schulte et al. | |

(Continued)

FOREIGN PATENT DOCUMENTS

| | | |
|---|---|---|
| DE | K 23761 III | 11/1955 |
| DE | 1030213 | 5/1958 |

(Continued)

OTHER PUBLICATIONS

International Search Report for PCT Application No. PCT/US00/06508 dated Aug. 4, 2000.

(Continued)

Primary Examiner — Oluseye Iwarere

(57) ABSTRACT

The present methods and systems (including computer software, computer hardware, and an intermediary system) facilitate a transaction for non-fuel merchandise items at any fuel dispenser during a pre-pay or post-pay inside the store fuel sale. Consumers can select non-fuel merchandise items at a fuel dispenser (either via a fuel dispenser key pad or a separate computerized customer interface, attached to a fuel dispenser) at the time they are selecting their fuel at the fuel dispenser.

5 Claims, 6 Drawing Sheets

(56) References Cited

U.S. PATENT DOCUMENTS

| | | |
|---|---|---|
| 5,222,027 A | 6/1993 | Williams et al. |
| 5,229,946 A | 7/1993 | Ghaem |
| 5,267,348 A | 11/1993 | Someya et al. |
| 5,311,421 A | 5/1994 | Nomura et al. |
| 5,331,994 A | 7/1994 | Bryan, III et al. |
| 5,408,586 A | 4/1995 | Skeirik |
| 5,423,457 A | 6/1995 | Nicholas et al. |
| 5,441,072 A | 8/1995 | Indey et al. |
| 5,486,998 A | 1/1996 | Corso |
| 5,504,675 A | 4/1996 | Cragun et al. |
| 5,596,501 A | 1/1997 | Comer et al. |
| 5,602,745 A | 2/1997 | Atchley et al. |
| 5,625,552 A | 4/1997 | Mathur et al. |
| 5,629,863 A | 5/1997 | Palozzi et al. |
| 5,719,781 A | 2/1998 | Leatherman et al. |
| 5,726,880 A | 3/1998 | Bailey et al. |
| 5,734,851 A | 3/1998 | Leatherman et al. |
| 5,757,664 A | 5/1998 | Rpgers et al. |
| 5,771,278 A | 6/1998 | Brown |
| 5,831,861 A | 11/1998 | Warn et al. |
| 5,868,177 A | 2/1999 | Leahy et al. |
| 5,874,787 A | 2/1999 | Meyer et al. |
| 5,895,457 A | 4/1999 | Kurowski et al. |
| 5,926,097 A | 7/1999 | Kobayashi et al. |
| 5,954,089 A | 9/1999 | Seymour |
| 5,956,254 A | 9/1999 | Collins |
| 5,974,345 A | 10/1999 | Buck et al. |
| 5,980,090 A | 11/1999 | Royal, Jr. et al. |
| 6,007,227 A | 12/1999 | Carlson |
| 6,024,142 A | 2/2000 | Bates |
| 6,052,629 A | 4/2000 | Leatherman et al. |
| 6,055,521 A | 4/2000 | Ramsey et al. |
| 6,078,896 A | 6/2000 | Kaehler et al. |
| 6,089,284 A | 7/2000 | Kaehler et al. |
| 6,097,993 A | 8/2000 | Skupin et al. |
| 6,112,134 A | 8/2000 | Terranova et al. |
| 6,116,505 A * | 9/2000 | Withrow .................. 235/381 |
| 6,152,591 A | 11/2000 | McCall et al. |
| 6,163,738 A | 12/2000 | Miller |
| 6,176,421 B1 | 1/2001 | Royal, Jr. et al. |
| 6,298,331 B1 * | 10/2001 | Walker ............ G06Q 10/087 |
| | | 705/15 |
| 6,321,984 B1 | 11/2001 | McCall et al. |
| 6,324,529 B1 | 11/2001 | Kamihira et al. |
| 6,351,689 B1 | 2/2002 | Carr et al. |
| 6,390,151 B1 | 5/2002 | Christman et al. |
| 6,401,009 B1 | 6/2002 | Chandonnet |
| 6,401,045 B1 | 6/2002 | Rogers et al. |
| 6,442,448 B1 | 8/2002 | Finley et al. |
| 6,470,233 B1 | 10/2002 | Johnson, Jr. |
| 6,527,176 B2 | 3/2003 | Baric |
| 6,535,795 B1 | 3/2003 | Schroeder et al. |
| 6,643,623 B1 | 11/2003 | Kolls |
| 6,732,081 B2 | 5/2004 | Nicholson |
| 7,383,204 B2 | 6/2008 | McCall et al. |
| 7,542,919 B1 * | 6/2009 | Mueller ............ G06Q 10/087 |
| | | 705/16 |
| 2002/0070271 A1 * | 6/2002 | Terranova et al. ........... 235/381 |
| 2002/0095343 A1 * | 7/2002 | Barton et al. .................. 705/16 |
| 2002/0147648 A1 * | 10/2002 | Fadden et al. .................. 705/16 |
| 2003/0028285 A1 * | 2/2003 | Zura ....................... G06Q 10/08 |
| | | 700/241 |
| 2004/0060229 A1 * | 4/2004 | Todd ........................ C10L 1/14 |
| | | 44/603 |
| 2004/0138953 A1 * | 7/2004 | Van Luchene ......... G06Q 20/20 |
| | | 705/16 |
| 2004/0215575 A1 * | 10/2004 | Garrity ........................... 705/64 |
| 2005/0055874 A1 * | 3/2005 | Bekemeyer .............. B67D 7/74 |
| | | 44/629 |
| 2006/0175396 A1 * | 8/2006 | Call et al. ..................... 235/380 |
| 2006/0201574 A1 * | 9/2006 | Whitehall .............. F02M 25/00 |
| | | 141/9 |
| 2006/0259230 A1 * | 11/2006 | Waters .................. F02M 25/00 |
| | | 701/115 |
| 2006/0271431 A1 * | 11/2006 | Wehr .................... G06Q 20/20 |
| | | 705/14.27 |
| 2007/0106559 A1 * | 5/2007 | Harrell .......................... 705/21 |
| 2008/0040287 A1 * | 2/2008 | Harrell et al. .................. 705/71 |
| 2009/0138365 A1 * | 5/2009 | Mueller ................ G06Q 20/12 |
| | | 705/14.19 |
| 2009/0289113 A1 * | 11/2009 | Vilnai et al. .................. 235/381 |
| 2010/0051691 A1 * | 3/2010 | Brooks ................ G06Q 20/20 |
| | | 235/380 |
| 2010/0293841 A1 * | 11/2010 | Zuckerman ............... C10L 1/14 |
| | | 44/325 |
| 2010/0306069 A1 * | 12/2010 | Austin .................. G06Q 10/06 |
| | | 705/16 |

FOREIGN PATENT DOCUMENTS

| | | |
|---|---|---|
| DE | 1044475 | 11/1958 |
| DE | 9002828.7 | 8/1990 |
| FR | 2756268 | 5/1998 |
| WO | 00/54172 | 9/2000 |

OTHER PUBLICATIONS

European Search Report for EP Application No.00921386.9 dated Dec. 1, 2006.
European Search Report for EP Application No. 00921386.9 dated Feb. 20, 2007.
Office Action dated Apr. 26, 2001 for U.S. Appl. No. 09/502,899.
Final Office Action dated Dec. 5, 2001 for U.S. Appl. No. 09/502,899.
Office Action dated May 22, 2002 for U.S. Appl. No. 09/502,899.
Final Office Action dated Jan. 14, 2003 for U.S. Appl. No. 09/502,899.
Office Action dated Feb. 2, 2004 for U.S. Appl. No. 09/502,899.
Office Action dated Oct. 24, 2005 for U.S. Appl. No. 09/502,899.
Final Office Action dated Feb. 16, 2006 for U.S. Appl. No. 09/502,899.
Office Action dated Jun. 20, 2006 for U.S. Appl. No. 09/502,899.
Office Action dated Oct. 3, 2003 for U.S. Appl. No. 10/030,656.
Final Office Action dated Mar. 8, 2004 for U.S. Appl. No. 10/036,656.
Office Action dated Nov. 17, 2004 for U.S. Appl. No. 10/036,656.
Final Office Action dated Aug. 25, 2005 for U.S. Appl. No. 10/036,656.
Office Action dated Jan. 13, 2006 for U.S. Appl. No. 10/036,656.

* cited by examiner

Fuel Dispenser Receipt

```
Address
City, ST ZIP

SITE:              9000
DATE:          12-02-08
TIME:             08:55
TRACE:             4422

PUMP:                 8
PRODUCT:        UNLEAD
PRICE/GAL       $3.709
NET/GAL:        $3.709
QTY(GAL)    :    0.775
FUEL TOTAL:      $2.87
EEC 4FLOZ        $1.99
TAX AMT:         $0.14
- - - - - - - - - - - -
TOTAL:           $5.00
PREPAY AMT:      $5.00
REFUND:          $0.00

================
    Thank You!
   Use Additech
  regularly to save
 gas and save money!
================
```

— Fuel Total plus non-fuel merchandise total (incl. tax)

— Total, including fuel and non-fuel merchandise, and any refund due customer at the kiosk.

FIG. 5

METHOD AND SYSTEM FOR PURCHASING NON-FUEL MERCHANDISE

PRIORITY CLAIM

The present application claims priority to prior U.S. Provisional Patent Application No. 61/183,045 filed Jun. 1, 2009.

BACKGROUND OF THE INVENTION

1. Field of the Invention

The present invention relates to a method and system for purchasing non-fuel merchandise where the selection is made at the fuel dispenser, and in particular, where payment is made inside the store.

2. Description of the Related Art

Today's retail fuel stations allow consumers to pay for fuel and service items (e.g., car wash) at the fuel dispenser with a credit card. However, a large percentage of customers "pre-pay" for their fuel before dispensing the fuel. That is, the customer enters the store (or kiosk) and pays for the fuel prior to dispensing the fuel. Current retail fuel station technologies do not enable consumers to purchase non-fuel merchandise on or at a fuel dispenser for such "pre-pay" fuel sales.

In a "Post Pay" fuel station transaction, a consumer pumps their fuel first, then pays inside the convenience store, potentially purchasing other non-fuel merchandise inside the convenience store today. However, in this type of transaction the consumer cannot order non-fuel merchandise at the fuel pump for "post payment."

Sometimes these type of transactions are referred to as "pay-inside" sales or "pay at kiosk" sales That is, they address those fuel and convenience store sales in which a consumer walks into a convenience store and pays with cash or credit before or after they pump their fuel.

Currently, consumers cannot select and purchase non-fuel merchandise at the fuel dispenser on either of pre-pay or post pay types of pay-inside transactions. If a consumer wishes to purchase non-fuel merchandise on a pay-inside transaction, they must select and pay for the merchandise inside the convenience store and pay the cashier.

To date, no method has been devised for handling non-fuel merchandise transactions at the fuel dispenser (car wash or any other items) on pay-inside fuel transactions, whether they be pay-inside before pumping fuel (pre-pay) or pay-inside after pumping fuel (post pay).

It would be beneficial to the consumer to have the ability to order non-fuel merchandise items at the fuel dispenser, even if the consumer was conducting a "pre pay" or "post pay" pay-inside transaction. This allows the consumer and the store to avoid a series of transactions.

Others have attempted to integrate non-fuel purchases with fuel purchases into point of sales systems. See, e.g., U.S. Pat. Nos. 6,321,984; 6,732,081; and 7,383,204, which are incorporated by reference.

SUMMARY OF THE INVENTION

The problems outlined above associated with pre-pay and post-pay inside the store transactions are addressed by the methods and systems of the present invention. The present methods and systems (including computer software, computer hardware, and an intermediary system to facilitate a transaction for non-fuel merchandise items at any fuel dispenser during a pre-pay or post-pay inside the store fuel sale. Consumers can select non-fuel merchandise items at a fuel dispenser (either via a fuel dispenser key pad or a separate computerized customer interface, attached to a fuel dispenser) at the time they are ordering their fuel at the fuel dispenser.

Broadly speaking, in a pre-pay situation, the consumer tenders a total amount inside the store. After tendering, the consumer selects a non-fuel merchandise item from an interface at the fuel dispenser. This selection is passed to a point-of-sale system, preferably through an intermediary system which recognizes a specified message protocol. A balance remaining is determined based on the total amount and purchase price of the non-fuel merchandise selection. The fuel dispenser is enabled to deliver the balance remaining to the consumer in fuel.

Generally, in a post-pay situation, the consumer selects a payment option at the fuel dispenser to pay after dispensing fuel. The fuel dispenser is enabled to dispense the fuel and the consumer may select a non-fuel merchandise item from an interface at the fuel dispenser. After fueling, a total amount is determined based on the fuel dispensed and the non-fuel merchandise selected. The total amount is passed to a point-of-sale system associated with the store. Finally, the consumer tenders the total amount inside the store.

In preferred forms, the tender can be cash, credit, debit card, or any usual or customary form of payment. Of course, multiple non-fuel merchandise items may be purchased. Different user interfaces can be deployed at the fuel dispenser to facilitate the selection of non-fuel merchandise items. An intermediary system running a specified message protocol is useful to pass data between the fuel dispenser and the point-of-sale system. While the message protocol of the store point of sale system could be used in practicing the present invention, it is believed preferable to use a specified messaging protocol because many such store POS systems include proprietary components.

BRIEF DESCRIPTION OF THE DRAWINGS

FIG. 5 is a printout of a fuel dispenser receipt; and

DETAILED DESCRIPTION OF PREFERRED EMBODIMENTS

Figure 1:
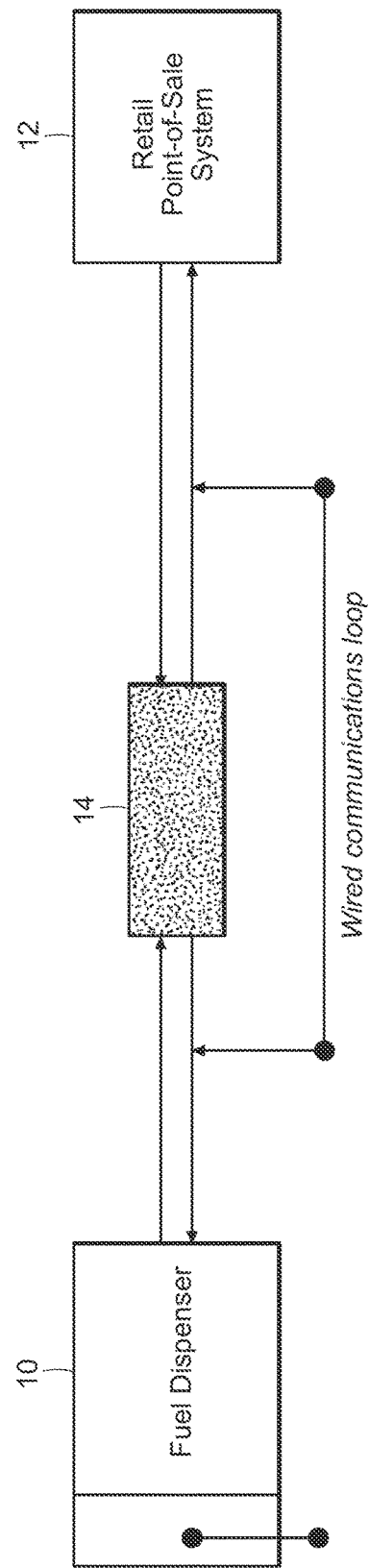
FIG. 1 is a block diagram depicting the fuel dispenser communication through an intermediary messaging protocol to the point of sale system.
Figure 4B:
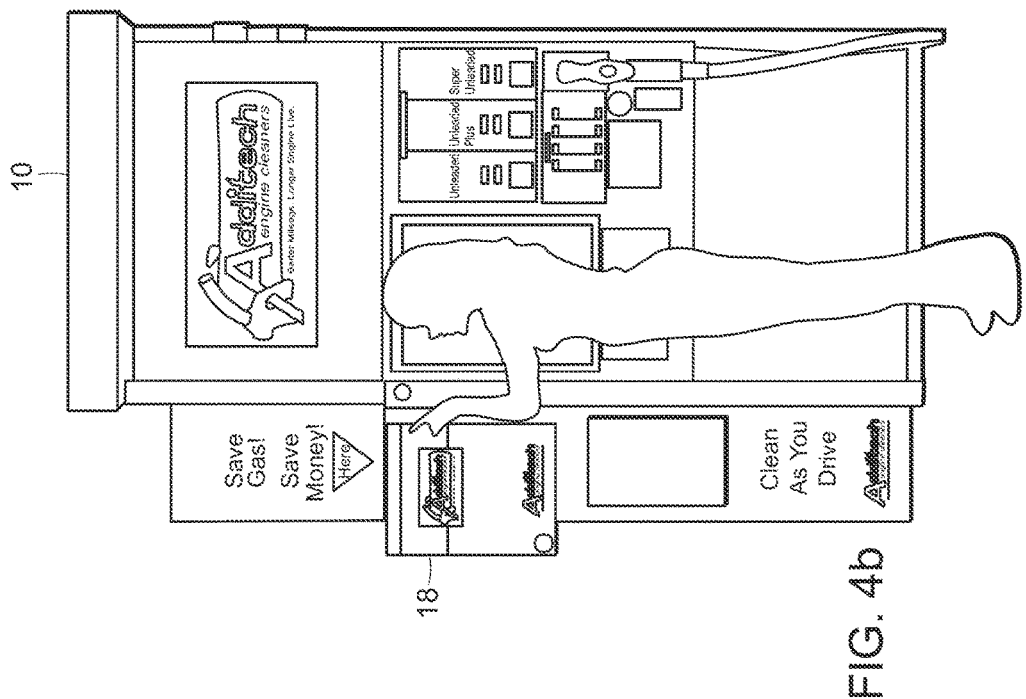
FIG. 4b is a graphical illustration of a user interface depicting a separate graphical interface positioned adjacent the fuel dispenser.

Turning to the drawings, FIG. 1 shows a fuel dispenser 10 connected to a point-of-sale system 12 via an intermediary system 14. The fuel dispenser 10 is conventional and an example is depicted in FIG. 4b.

Figure 4A:
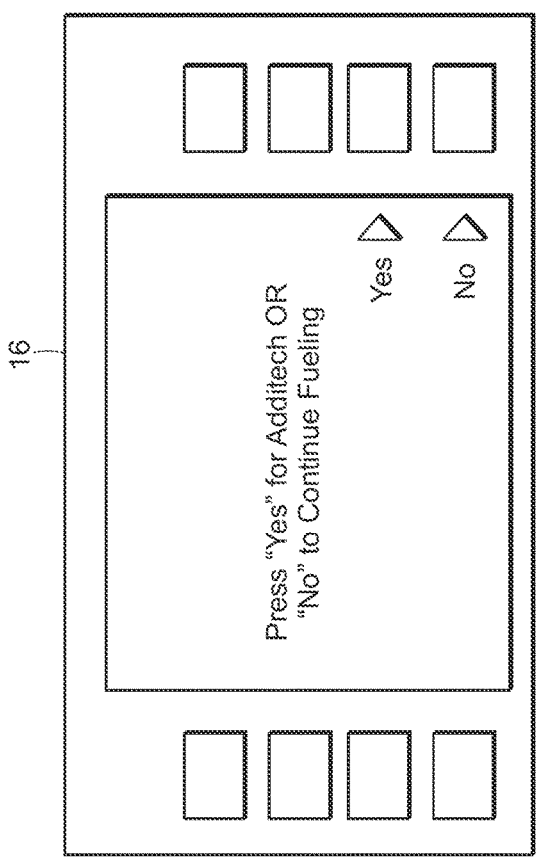
FIG. 4a is a graphical illustration of a user interface depicting a simple text based interface.
Figure 6:
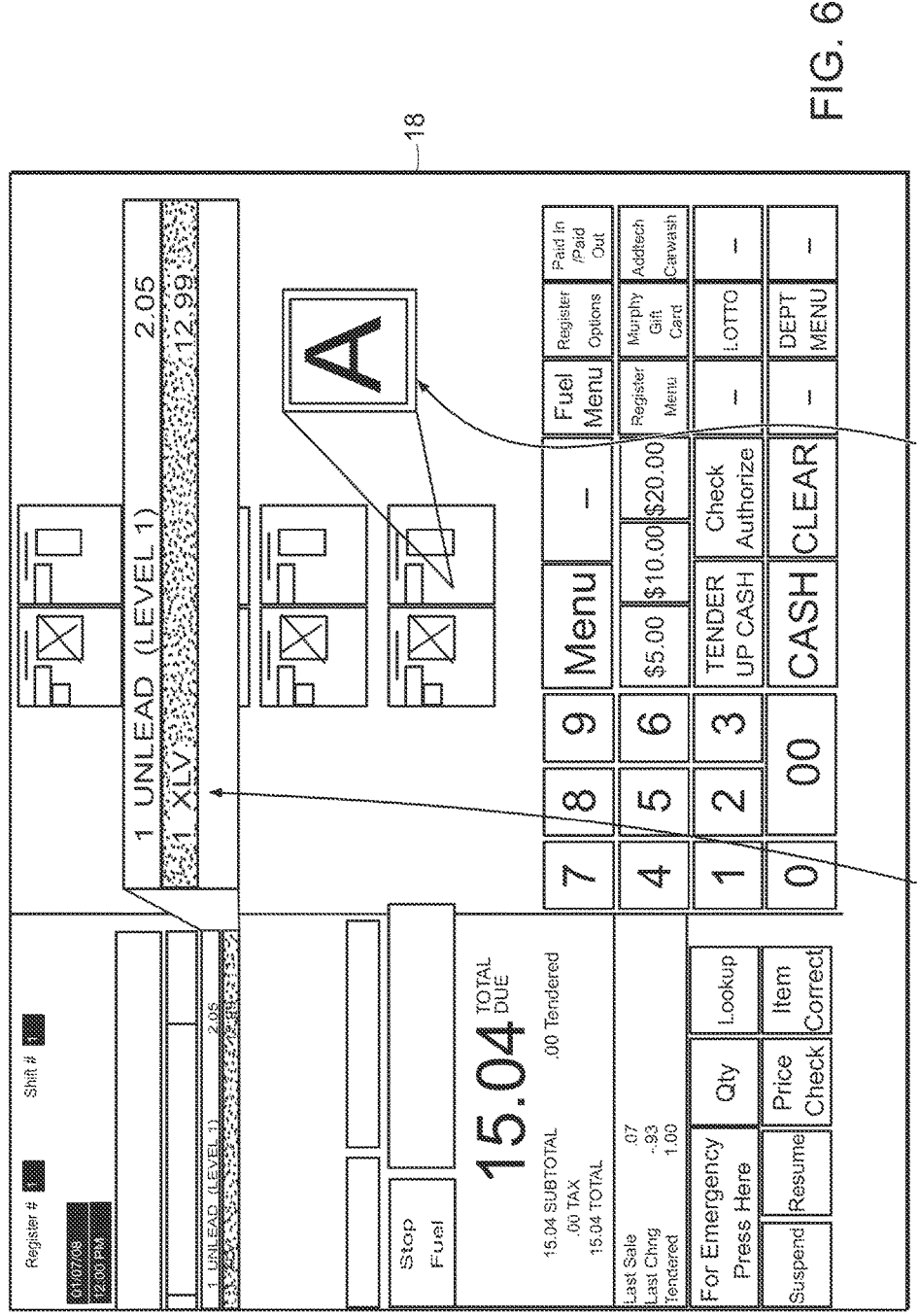
FIG. 6 is a screen shot showing in more detail the graphical interface of FIG. 4b.

The intermediary system 14 is a specialized computing device, consisting of hardware and software. The system 14 attaches to a new or existing data communications line that connects a retail fuel point-of-sale system 12 to a retail fuel dispenser 10. The system 14 includes a consumer interface, such as the text based interface 16 or graphic interface 18 in FIGS. 4a and 4b. The system 14 could include an Additech Inceptor device, such as made by Additech, Inc. of Houston, Tex. The system 14 utilizes a specified data communications protocol which defines a message standard that enables the system 14, any retail point-of-sale system 12, and any fuel dispenser 10 to communicate the choice of a non-fuel merchandise item from the fuel dispenser 10—or consumer interface 16, 18—to the retail point-of-sale system 12 inside the convenience store.

In FIG. 1, transaction data passes between fuel display 10 and said retail point of sale (POS) system 12 through intermediary system 14. The system 14 listens for data communications messages between dispenser 10 and POS 12. Messages not matching the specified communications protocol presumably relate to conventional purchases of fuel and are passed through. Upon identifying a message matching the specified protocol, the system 14 processes the message, assumes the message relates to a non-fuel merchandise purchase transaction, and triggers a consumer interface prompt on an attached consumer interface device 16, 18.

Figure 2:
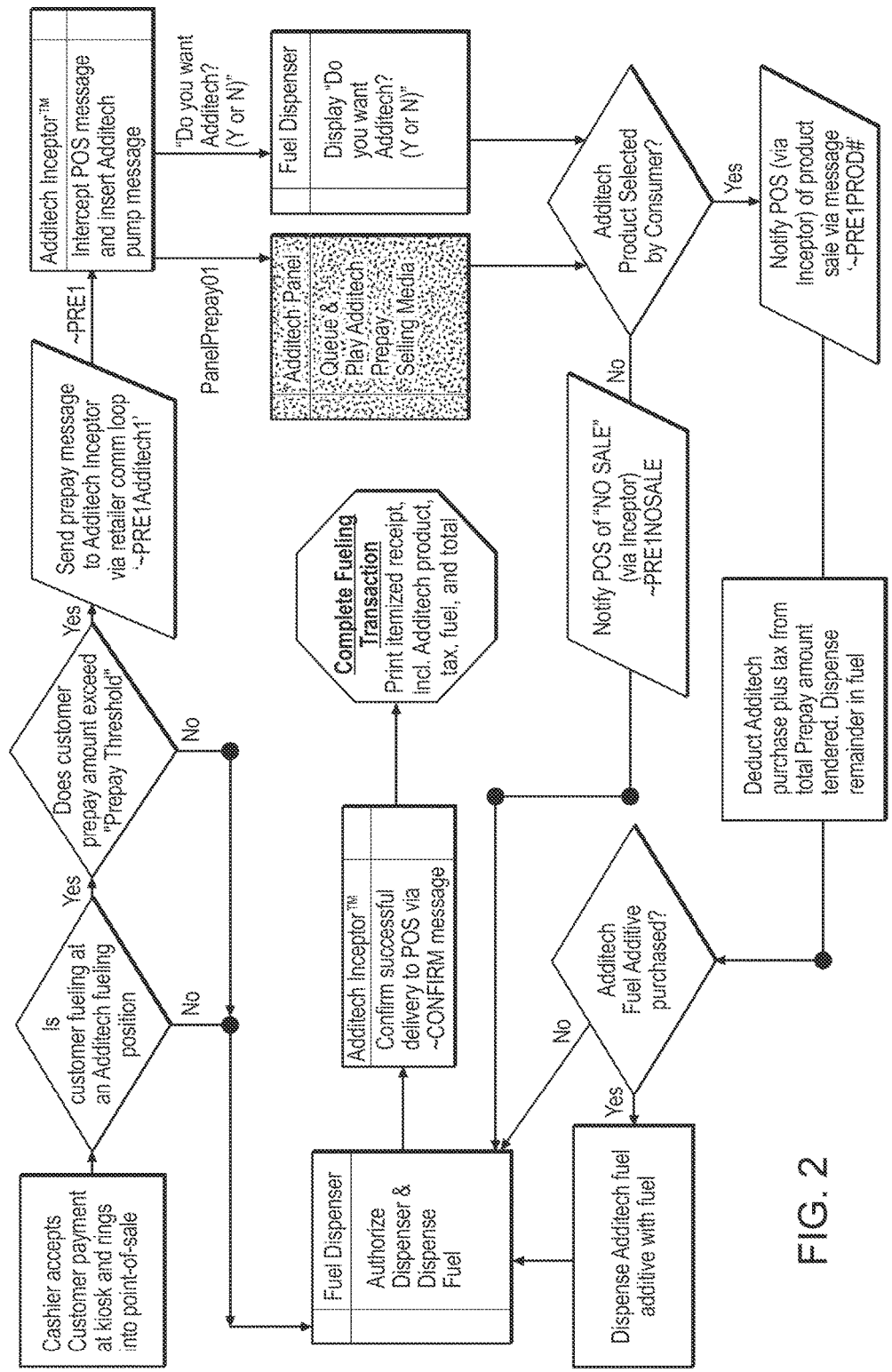
FIG. 2 is a flow chart depicting an example of a pre-pay transaction.

FIG. 2 depicts a flow chart for a "pre-pay" transaction. That is, a transaction where the consumer enters the store (or kiosk) first and tenders payment. Generally, this Pre-Pay, pay inside transaction, involves the following.

Example: Pre-Pay, Pay Inside Transaction

1. Consumer arrives at a fuel dispenser and proceeds inside the convenience store to pay for fuel prior to pumping.

2. Consumer gives attendant a total amount of $X, which serves as a credit for fuel, possibly purchasing other non-fuel merchandise inside the store, and then returns to fueling position.

3. Upon returning to fueling position, consumer is greeted with a message on the fuel dispenser screen to purchase a non-fuel item. This message is based on a standard protocol and is passed from the retail point-of-sale system through the intermediary system (FIG. 1) to the fuel dispenser.

4. Concurrently, the intermediary system 14 passes the message to the consumer interface device and the consumer is prompted by the consumer interface device for non-fuel items.

5. Consumer elects to purchase a non-fuel item at the dispenser, then the intermediary system passes a message back to the point-of-sale system to confirm the item selection. Per the specified messaging protocol, the retail point-of-sale system deducts the dollar amount for the non-fuel item (plus tax, if applicable) from the total amount tendered inside the convenience store.

6. The balance remaining of the total amount originally tendered is delivered in fuel.

Per the specified messaging protocol, at the end of the fuel transaction, the fuel dispenser or the consumer interface device prints a receipt displaying the fuel total, plus the non-fuel items, plus the taxable amount on the non-fuel items, FIG. 5.

Per the specified messaging protocol, the total amount of fuel plus all non-fuel items purchased at the fuel dispenser is not to exceed the total amount tendered by the consumer inside the convenience store.

Figure 3:
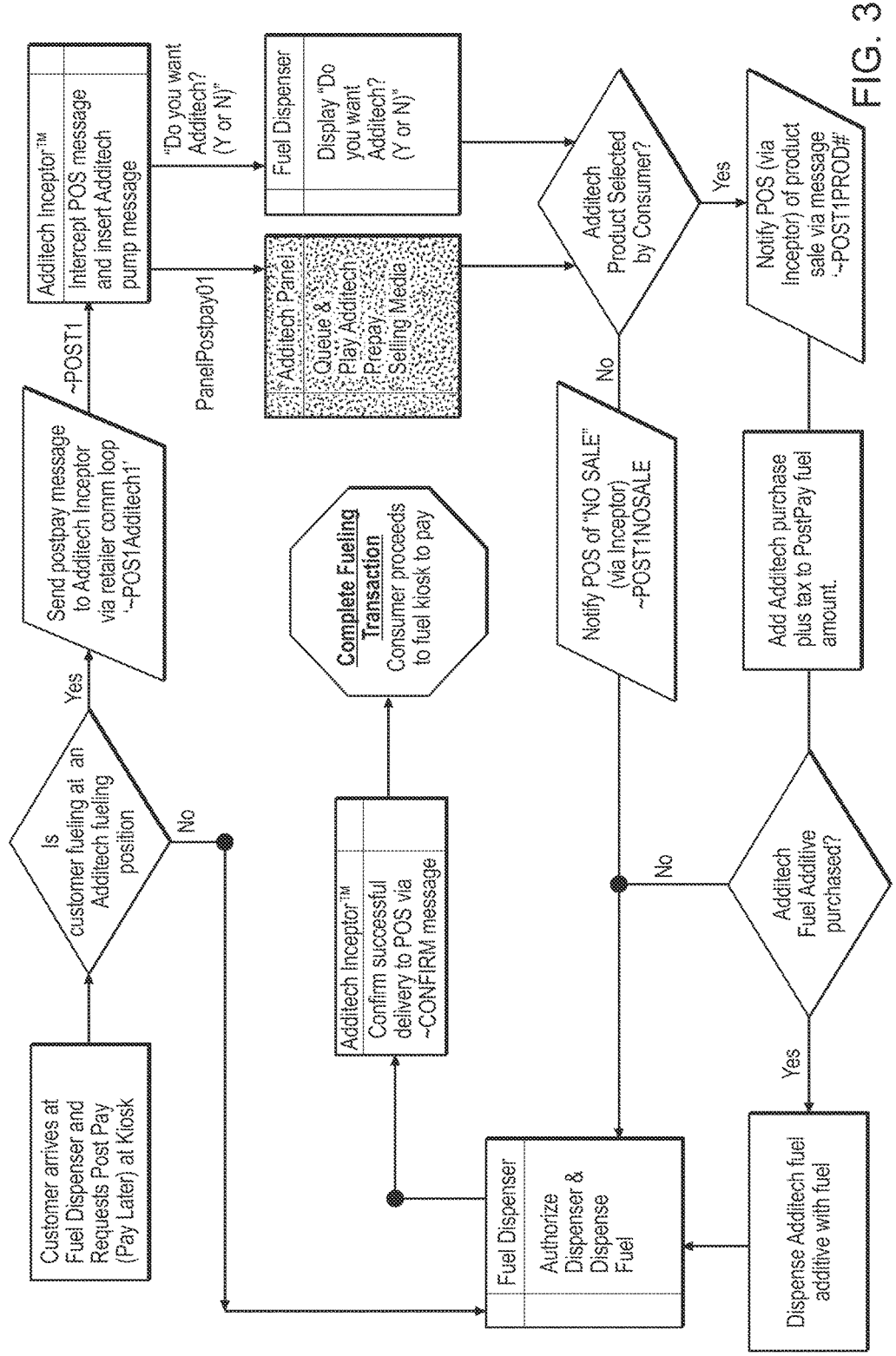
FIG. 3 is a flow chart depicting an example of a post-pay transaction.

FIG. 3 depicts a flow chart for a "post-pay" transaction. That is, a transaction where the consumer dispenses fuel first and enters the store (or kiosk) later to tender payment. Generally, this post-pay, pay inside transaction, involves the following.

Example: Post-Pay, Pay Inside Transaction

1. Consumer arrives at fuel dispenser and presses a button on fuel dispenser to indicate his desire to pump fuel and pay inside the convenience store after he is finished pumping.

2. Intermediary system 14 receives a message from the retail point-of-sale system (defined in the messaging data) to indicate that a post-pay transaction is occurring at the fuel position. Intermediary system 14 forwards consumer prompt to fuel dispenser to present to consumer.

3. Fuel dispenser presents message on screen to consumer for non-fuel merchandise item(s). In addition, if consumer interface device 16, 18 is attached to fuel dispenser, then consumer interface also prompts consumer for merchandise item(s).

4. Consumer selects non-fuel merchandise item(s). If an item is selected on the fuel dispenser, the intermediary passes the selection through to the retail point-of-sale system. If selection is made on the consumer interface device, then the intermediary system inserts the product selection into the data stream from the fuel dispenser to the retail point-of-sale system using data communications protocol.

5. Retail point-of-sale system receives message from fuel dispenser. If consumer has selected a non-fuel item, then the item is appended to that particular fuel transaction (plus tax if a taxable item) and presented to the attendant at the point-of-sale system for tender.

Specified Messaging Protocol

The following charts are intended to expand upon an example of the use of an intermediary system 14 and a specified messaging protocol to permit normal fuel transactions between the fuel dispenser and the point-of-sale system and also to permit non-fuel merchandise purchases in accordance with the present invention.

Pre-Pay Transaction

| Customer Action | Retailer Point-of-Sale System Actions | Intermediary Actions | Fuel Dispenser Actions |
|---|---|---|---|
| Pay for Fuel at Kiosk | 1) Check to determine whether customer is using a fuel dispenser equipped with system 2) Check POS configurable pre-pay threshold to ensure customer pre-pay amount exceeds pre-set threshold required to purchase | 1) Intermediary passes message through to fuel dispenser with display text "Do you want to purchase X today? Yes or No" AND Intermediary sends data message to Panel to play digital media selling message. | |

-continued

| Customer Action | Retailer Point-of-Sale System Actions | Intermediary Actions | Fuel Dispenser Actions |
|---|---|---|---|
| | 3) Send pre-defined pre-pay data message to Intermediary via retailer data comm. loop '~PRE11' Embedded in message is default text to appear on fuel dispenser screen, "Do you want to purchase X today? Yes or No" | | |
| Return to fueling position Select a product on consumer interface device OR say "No" on the consumer interface device OR say "No" on the fuel dispenser interface | 1) Send pre-defined message to fuel dispenser, display on fuel dispenser user interface "Do you want X (Y or N)" | 1) Intermediary receives pre-defined message '~PRE11' from POS and over-writes text portion with customized fuel dispenser message "Get X to save gas (Y or N)", and forwards message along to fuel dispenser. 2) Send message 'PanelPre-pay 01' to Panel (consumer interface device) to queue selling interactive media. 3) Listen for response from consumer interface device for specific product selection or "no" product selected. 4) If consumer selects product on consumer interface device, then Intermediary packages-up the product selection into a fuel dispenser response message '~PRE1PROD#' and sends message to POS to acknowledge product purchase to POS. | 1) Display prompt attached to '~PRE111' on the fuel dispenser customer interface screen "Do you want X (Y or N)" 2) Wait for consumer to answer prompt on fuel dispenser interface, or timeout prompt if not answered in pre-configured time 3) Wait for Intermediary to send a response to the POS (either with product purchase acknowledgement - '~PRE1PROD#' or "No Product Purchased" message '~PRE1NOSALE'. 4) Continue with fueling |
| Pump Fuel | 1) If non-fuel merchandise selected at pump, then deduct price of merchandise plus tax from total pre-pay cash amount tendered on the POS. 2) Authorize fuel dispenser for remaining amount tendered. | 1) If fuel additive purchased, then upon seeing dispenser fuel pulses (indicating fuel flow), Intermediary informs hydraulic controller to dispense additive. 2) hydraulic controller dispenses fuel additive product selected. | 1) Dispense authorized fuel amount (total tendered at kiosk less price of non-fuel merchandise including tax) |
| Hang up fuel nozzle | 1) If product sold, then await confirmation from Intermediary of successful additive delivery. 2) Send receipt print message to fuel dispenser to print fuel amount, non-fuel merchandise amount, tax, and total on fuel dispenser receipt printer. | 1) If product purchased was fuel additive, then confirm successful additive delivery 2) Send a confirmation message to POS confirming successful additive delivery '~CONFIRM'. | Print itemized receipt, including: Fuel amount Product amount Product tax Total |

Post-Pay Transaction

| Customer Action | Retailer Point-of-Sale System Actions | Intermediary Actions | Fuel Dispenser Actions |
|---|---|---|---|
| Arrive at fueling position and begin fuel transaction Select fueling option "pay inside after fueling" | 1) Send pre-defined message to fuel dispenser to display on fuel dispenser user interface "Do you want X (Y or N)" | 1) Intermediary captures pre-defined POS message '~POS11' from POS and passes message along to fuel dispenser. Fuel dispenser displays text portion of message "Do | 1) Display prompt attached to '~POS11' on the fuel dispenser customer interface screen "Do you want X (Y or N)" 2) Wait for consumer to answer prompt on fuel |

| Customer Action | Retailer Point-of-Sale System Actions | Intermediary Actions | Fuel Dispenser Actions |
|---|---|---|---|
| | | you want X (Y or N)". 2) Send message 'PanelPostpay01' to consumer interface device to play interactive selling media. 3) Listen for response from consumer interface device for specific product selection or "no" product selected. 4) If consumer selects product on consumer interface device, then Intermediary packages-up the product selection into a fuel dispenser response message '~POST1PROD#' and sends message to POS to acknowledge purchase of product to POS. | dispenser interface, or timeout prompt if not answered in pre-configured time 3) Wait for Intermediary to send a response to the POS (either with product purchase acknowledgement - '~POST1PROD#' or "No Product Purchased" message '~POST1NOSALE'). 4) Continue with fueling |
| Pump Fuel | 1) If non-fuel merchandise selected at pump, then add price of merchandise plus tax to fuel purchase and tender total on POS. 2) Authorize fuel dispenser | 1) If fuel additive purchased, then upon seeing dispenser fuel pulses (indicating fuel flow), Intermediary informs hydraulic controller to dispense additive. 2) hydraulic controller dispenses fuel additive product selected. | 1) Dispense fuel (up to POS-authorized limit) |
| Hang up fuel nozzle | 1) If additive sold, then await confirmation from Intermediary of successful additive delivery. | 1) If product purchased was fuel additive, then confirm successful additive delivery 2) Send a confirmation message to POS confirming successful additive delivery '~CONFIRM'. 3) Inform consumer that product purchase will be added to their fuel purchase when they pay the attendant. | |

It will be appreciated to those skilled in the art having the benefit of this disclosure that this invention is believed to provide methods and systems for purchasing nonfuel merchandise items at a fuel dispenser. Further modifications and alternative embodiments of various aspects of the invention will be apparent to those skilled in the art in view of this description. Accordingly, this description is to be construed as illustrative only for the purpose of teaching those skilled in the art the general manner of carrying out the invention. It is to be understood that the forms of the invention shown and described herein are to be taken as the presently preferred embodiments. Changes may be made in the methods and systems described herein without departing from the spirit and scope of the invention as described in the following claims.

What is claimed:

1. A system, comprising:
   a fuel dispenser for dispensing fuel to a vehicle;
   a fuel additive system in communication with the fuel dispenser, wherein the fuel additive system comprises:
   a computer system; and
   a hydraulic controller for dispensing a fuel-additive product to the vehicle; and
   a point-of-sale system in communication with the fuel dispenser and the fuel additive system, wherein at least a portion of the point-of-sale system is located inside a retail store, and wherein the computer system of the fuel additive system is for:
   monitoring purchase messages between the fuel dispenser and the point-of-sale system for purchase selections made at the fuel dispenser to determine whether purchases at the fuel dispenser include the fuel-additive product;
   upon a determination that a first purchase message of the purchase messages between the fuel dispenser and the point-of-sale system does not include the fuel-additive product, subsequently passing the first purchase message to the point-of-sale system; and
   upon a determination that the first purchase message includes the fuel-additive product:
   creating a new purchase message regarding the fuel-additive product in a format receivable by the point-of-sale system and forwarding the new purchase message to the point-of-sale system; and
   upon detecting dispenser fuel pulses from the fuel dispenser indicative of fuel flow, controlling the hydraulic controller to dispense the fuel-additive product for the vehicle; and wherein the point-of-sale system is for presenting a total amount of the purchase selections at the point-of-sale system.

2. The system of claim 1, wherein the purchase messages comprise purchase messages for purchases of fuel, purchases of the fuel-additive product and/or the total amount.

3. The system of claim 1, wherein, upon the determination that the first purchase message includes the fuel-additive product, the point-of-sale system is further for determining the total amount based on fuel dispensed at the fuel dispenser and the new purchase message regarding the fuel additive product.

4. The system of claim 3, wherein determining the total amount is further based on purchase selections in addition to the fuel and the fuel-additive product.

5. The system of claim 1, wherein the fuel additive system is further for:
   upon the determination that the first purchase message includes the fuel-additive product, determining the total amount based on fuel dispensed at the fuel dispenser and the new purchase message regarding the fuel-additive product; and
   forwarding the total amount to the point-of-sale system.

\* \* \* \* \*